US012705360B1

(12) United States Patent
Haynes et al.

(10) Patent No.: US 12,705,360 B1
(45) Date of Patent: Aug. 11, 2026

(54) METHODS AND MECHANISMS FOR PREDICTING THE LIKELIHOOD OF A VULNERABILITY USED IN A RANSOMWARE EVENT

(71) Applicant: EJ2 Communications, Inc., New York, NY (US)

(72) Inventors: Benjamin Haynes, Richmond, VA (US); Jacob L. Kouns, Glen Allen, VA (US)

(73) Assignee: EJ2 Communications, Inc., New York, NY (US)

( * ) Notice: Subject to any disclaimer, the term of this patent is extended or adjusted under 35 U.S.C. 154(b) by 153 days.

(21) Appl. No.: 18/209,811

(22) Filed: Jun. 14, 2023

(51) Int. Cl.
*G06F 21/57* (2013.01)

(52) U.S. Cl.
CPC .................................. *G06F 21/577* (2013.01)

(58) Field of Classification Search
CPC ............. G06F 21/577; G06F 2221/034; G06F 2221/033; G06F 21/566; G06F 21/563; G06F 21/552; G06F 18/22; H04L 63/1433; H04L 63/1416; H04L 41/22; H04L 41/16; H04L 41/142
See application file for complete search history.

(56) References Cited

U.S. PATENT DOCUMENTS

2023/0036159 A1* 2/2023 Duppils ................ G06F 21/554
2024/0143781 A1* 5/2024 Bubshait ............... G06F 21/577
2024/0154990 A1* 5/2024 Kim .................... H04L 63/1416

* cited by examiner

*Primary Examiner* — Wasika Nipa
*Assistant Examiner* — Edgar W Xie
(74) *Attorney, Agent, or Firm* — Lowenstein Sandler LLP

(57) ABSTRACT

A system configured to obtain, by a processor, a plurality of vulnerabilities associated with one or more computer systems. The system is further configured to generate a set of fingerprints, wherein each fingerprint of the set of fingerprints is associated with a respective vulnerability of the plurality of vulnerabilities, by assigning a set of labels to each of the plurality of vulnerabilities. The system is further configured to generate a set of reduced fingerprints, wherein each reduced fingerprint comprises a value generated from performing one or more dimensionality reduction operations on a respective fingerprint. The system is further configured to generate a coordinate system based on the set of reduced fingerprints and identify, based on the coordinate system, a group of reduced fingerprints based on one or more determined correlations.

17 Claims, 8 Drawing Sheets

| Vulnerability 210 | Labels 220 |
| --- | --- |
| A | [0, 1, 0, 1, 0, 1, 1, 0, 0, 0, 1, 0, 1, 1, 1, 1, 1, 0, 0, 0] |
| B | [0, 0, 0, 1, 1, 1, 1, 0, 1, 0, 1, 0, 1, 0, 1, 1, 1, 0, 0, 1] |
| C | [1, 1, 0, 1, 0, 1, 0, 0, 1, 0, 1, 0, 1, 0, 0, 1, 0, 0, 1, 0] |
| … | … |
| … | … |
| … | … |
| N | M |

500

| Nearest Region Center | Ransomware Likelihood Rating |
|---|---|
| (-0.8, 0.5) | Low |
| (0.8, 0.25) | Medium |
| (0.2, 1.5) | Medium |
| (-0.2, -0.6) | High |
| Less than 0.2 from (-0.2, -0.6) | Critical |

FIG. 5

METHODS AND MECHANISMS FOR PREDICTING THE LIKELIHOOD OF A VULNERABILITY USED IN A RANSOMWARE EVENT

TECHNICAL FIELD

The present disclosure relates to predicting the likelihood of a vulnerability used in a ransomware event.

BACKGROUND

Ransomware is a type of malware that threatens to publish a victim's personal data or blocks access to the data unless a ransom is paid, potentially causing a significant outage and impact. Some forms of ransomware lock a computer system without damaging any files, while other forms of ransomware encrypt the victim's files and demand a ransom payment to decrypt them. Typically, Bitcoin and other cryptocurrencies are used for the ransoms, making tracing and prosecuting the malicious party responsible for the attack difficult.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a computer system is configured to obtain, by a processor, a plurality of vulnerabilities associated with one or more computer systems. The system is further configured to generate a set of fingerprints, wherein each fingerprint of the set of fingerprints is associated with a respective vulnerability of the plurality of vulnerabilities, by assigning a set of labels to each of the plurality of vulnerabilities. The system is further configured to generate a set of reduced fingerprints, wherein each reduced fingerprint comprises a value generated from performing one or more dimensionality reduction operations on a respective fingerprint. The system is further configured to generate a coordinate system based on the set of reduced fingerprints and identify, based on the coordinate system, a group of reduced fingerprints based on one or more determined correlations.

A further aspect of the disclosure includes a method according to any aspect or implementation described herein.

A further aspect of the disclosure includes a non-transitory computer-readable storage medium comprising instructions that, when executed by a processing device operatively coupled to a memory, performs operations according to any aspect or implementation described herein.

BRIEF DESCRIPTION OF THE DRAWINGS

The present disclosure is illustrated by way of example, and not by way of limitation in the figures of the accompanying drawings.

FIG. 5 is a ratings table illustrating a rating data structure, in accordance with some implementations of the present disclosure.

DETAILED DESCRIPTION

Figure 1:
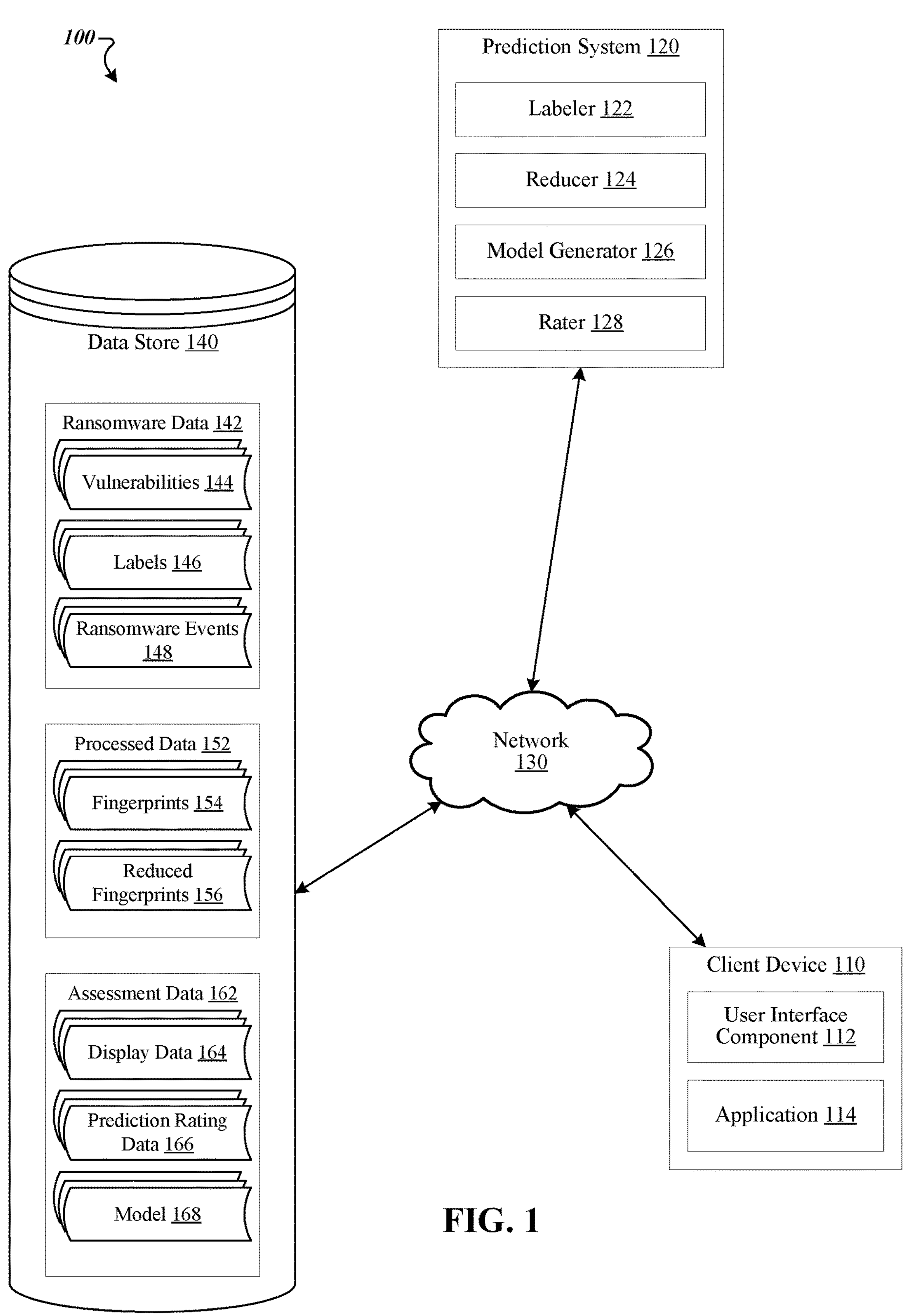
FIG. 1 is a block diagram illustrating an example system architecture, in accordance with some implementations of the present disclosure.

Described herein are technologies directed to methods and mechanisms for predicting a likelihood of a ransomware event for a vulnerability.

Malicious activity, often caused by malware, includes actions performed over a network that are committed with the intention of being damaging to other users or organizations that operate online. Malware is software that is intentionally designed to cause disruption to a computer, a server, a client, or a computer network, and also designed to leak private information, gain unauthorized access to information or resources, deprive users of access to information, or knowingly interfere with the user's computer security and privacy. Common malware can include computer viruses, worms, Trojan horses, keyloggers, ransomware, spyware, and the like.

One type of malicious activity is caused by ransomware, which is a type of malware designed to deny a user or business access to files on their computer systems or servers. An example of ransomware includes encryption-based ransomware that encrypts files and demands a ransom payment for the decryption key, or the files will be deleted. This creates an outage for organizations, forcing them to either pay the ransom, suffer a loss of critical operations, or risk losing valuable data entirely.

To access computer systems, ransomware typically exploits a vulnerability on the computer system. Vulnerabilities are flaws in a computer system that weaken the overall security of the system or a device of the system. In particular, vulnerabilities can be weaknesses in either the hardware of the computer system, and/or the software that runs on the hardware. Vulnerabilities can be exploited by a threat actor, such as an attacker, to cross privilege boundaries (e.g., perform unauthorized actions) within the computer system. To exploit a vulnerability, an attacker typically has at least one applicable tool or technique that can connect to a particular system weakness. These tools or techniques are commonly called "exploits." Specifically, an exploit can refer to software, data, or a sequence of commands that takes advantage of a vulnerability to cause unintended or unanticipated behavior to occur on computer software and/or hardware.

On a set of computer systems, tens of thousands to hundreds of thousands of vulnerabilities can exist, with new ones appearing daily. Currently, organizations lack the resources to fix them all, or even identify which vulnerabilities are exploitable and pose a risk to their systems. In many instances, organizations typically implement reactionary measures to ransomware attacks. For example, in response to a ransomware event, an organization may respond by attempting to recover data using a backup server or backup files. Unfortunately, currently there is a lack of preventive systems capable of identifying and/or preventing ransomware events from occurring in the first place. Therefore, proactive systems capable of predicting a likelihood of a ransomware event occurring are desirable.

Aspects and implementations of the present disclosure address these and other shortcomings of the existing technology by enabling a system to identify a likelihood of a particular vulnerability being used in a ransomware event. In some implementations, the present system can be configured to generate a profile for each vulnerability of a set of known vulnerabilities. Each profile, referred to as a "fingerprint" can be generated by assigning a set of classifiers (referred to as "labels") to each corresponding vulnerability. Each label can indicate a parameter or attribute of the vulnerability, such as, for example, whether a vulnerability is remotely exploitable, whether the vulnerability can affect confidential data, whether the vulnerability was previously fixed or patched, and so forth. For each vulnerability, the corresponding labels can be expressed as a binary array (an array consisting of 0s and 1s). In an illustrative example, the fingerprint for each vulnerability can be a 60-dimension binary array (e.g., Vulnerability A: [0, 1, 1, 0, 1, . . . , 0], where each dimension is indicative of a particular label (e.g., the first dimension (0) indicates that vulnerability A is not remotely exploitable, the second dimension (1) indicates that vulnerability A affects confidential data, and so forth).

The present system can reduce each fingerprint to a pair of principal components using, for example, Principal Component Analysis (PCA). PCA is a dimensionality reduction method capable of reducing the dimensionality of a large data set by transforming the large set of variables into a smaller data set that retains most or all the information in the large set. Each pair of principal components (referred to as a reduced fingerprint) can be expressed as Cartesian coordinates and plotted on a scatter plot. As such, the present system displays each reduced fingerprint on the scatter plot, where each reduced fingerprint relates to a particular labeled vulnerability.

The present system can then identify the reduced fingerprints that are related to a ransomware event. The present system can also generate a set of regions based on, for example, the grouping of the reduced fingerprints. For example, the present system can identify a grouping indicative of vulnerabilities that mostly have been used in ransomware events, a grouping indicative of vulnerabilities that have exploits but have mostly not been used in ransomware events, a grouping of vulnerabilities that mostly have no exploits, etc. Each group can be indicative of the likelihood level (e.g., low, medium, high, critical, etc.) that a vulnerability that falls within the grouping would be used in a ransomware event. In response to a new vulnerability appearing, the present system can generate a fingerprint for the vulnerability, reduce and plot the fingerprint, and, based on the location of the fingerprint on the scatter plot, determine likelihood of the particular vulnerability being used in a future ransomware event.

Aspects of the present disclosure result in technological advantages of predicting the likelihood that a new vulnerability will be used in a ransomware event. This enables the present system to provide preventive capabilities to organizations in making threat assessments by identifying whether a vulnerability poses a serious threat, thus allowing the organization to better focus resources to patch vulnerabilities. This can result in the ability to prevent costly and damage attacks against the organization computer systems.

FIG. 1 depicts an illustrative computer system architecture 100, according to aspects of the present disclosure. Computer system architecture 100 includes a client device 110, prediction system 120, and data store 140.

The client device 110 can include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. Client device 110 can include user interface (UI) component 112 and application 114.

Application 114 can be a computer program configured to provide services, analytics, and predictive technologies performed by prediction system 120. One or more predictive systems or models can be generated by prediction system 120, which is discussed with regards to FIG. 6. User interface component 112 can receive user input (e.g., via a Graphical User Interface (GUI) displayed via client device 110) associated with application 114. In some implementations, user interface 112 can be presented via a web browser (not shown) and application 114 can be hosted on an application server (not shown). Alternatively, client device 110 includes a local (mobile or desktop) application 114 that provides user interface component 112. In some implementations, user interface 112 can communicate with the application 114 via network 130. User input component 112 can further receive user input display data related to prediction system 120, such as, for example, predictive data indicative of a likelihood of a ransomware event, display data, etc.

In some implementations, prediction system 120 can be configured to generate a predictive model used to identify a likelihood of a particular vulnerability being used in a ransomware event. Prediction system 120 can include labeler 122, reducer 124, model generator 126, and rater 128, all of which will be explained in detail below. In some implementations, client device 110 can be configured to instruct prediction system 120 to generate the predictive model and/or identify a likelihood of a particular vulnerability being used in a ransomware event.

Client device 110, prediction system 120, and data store 140 can be coupled to each other via a network 130. In some implementations, network 130 is a public network that provides client device 110 with access to prediction system 120, and data store 140, and other publicly available computing devices. In some implementations, network 130 is a private network that provides client device 110 access to prediction system 120, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long-Term Evolution (LTE) network), routers, hubs, switches, server computers, cloud computing networks, and/or a combination thereof.

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). The data store 140 can store data associated with processing ransomware related data. In particular, data store 140 can store ransomware data 142, processed data 152, and assessment data 162.

Ransomware data 142 can include vulnerabilities data 144, labels data 146, and ransomware events data 148. Each instance of vulnerabilities data 144 can include one or more of a vulnerability name, identifier, etc. Each vulnerability can relate to a particular flaw in a computer system that weakens the overall security of the computer system or a device of the computer system. In particular, each vulnerability can relate to one or more weaknesses in the hardware of a computer system, software that runs on the hardware, or any combination thereof.

Labels data 146 can include data (e.g., classifiers) describing one or more parameters or attributes of a vulnerability. Each instance of labels data 146 (referred to as a label) can indicate whether a vulnerability is remotely exploitable, the difficulty level of exploiting the vulnerability, whether the vulnerability can affect confidential data, which device or system does an exploit of the vulnerability affect, whether the vulnerability has been previously fixed or patched, the type of data an exploit of the vulnerability would affect, the age of the vulnerability, the operating system the vulnerability is associated with, or any other parameters or attributes of a vulnerability.

Each instance of ransomware events data 148 can include one or more known or recorded ransomware events. In some implementations, a ransomware event can include any event (e.g., attack) that exploited a vulnerability for the purpose of ransomware. Ransomware events can include Crypto Ransomware or Encryptors events, Lockers events, Scareware events, Doxware or Leakware events, RaaS (Ransomware as a Service) events, etc. In some implementations, each instance of ransomware events data 148 can include additional data, such as time data (e.g., first recorded instance of the ransomware event), location data (e.g., where the ransomware event occurred), exploit data (e.g., which vulnerability was exploited), or any other data related to the ransomware event.

Processed data 152 can include data generated by prediction system 120. In some implementations, processed data 152 can include fingerprints 154 and reduced fingerprints 156.

Each fingerprint 154 can include data relating to how a particular vulnerability correlates to one or more labels. In some implementations, each fingerprint 154 can be represented by a data structure, such as a metadata table, a matrix array, a binary array, etc. In one illustrative example, each fingerprint can be represented by a data structure that lists one or more labels related to a particular vulnerability (e.g., a metadata table). In another illustrative example, each fingerprint can be represented by a binary array. A binary array is an array consisting of 0s and 1s. As such, in an example, each binary array can indicate whether each label relates to a particular vulnerability or does not relate to a particular vulnerability.

Figure 2:
FIG. 2 illustrates a fingerprint table, in accordance with some implementations of the present disclosure.

FIG. 2 illustrates fingerprint table 200, according to some aspects of the present disclosure. Fingerprint table 200 includes a set of records, each record listing a particular vulnerability and a binary array indicative of the corresponding labels for the particular vulnerability. As shown, fingerprint table 200 includes vulnerability column 210 and labels column 220. Vulnerability column 210 includes a listing of vulnerabilities A-N. Labels column 220 includes a listing of corresponding 20-dimension binary arrays indicative of the labels that apply for each corresponding vulnerability. For example, vulnerability A corresponds to a 20-dimension binary array of [0, 1, 0, 1, 0, 1, 1, 0, 0, 0, 1, 0, 1, 1, 1, 1, 1, 0, 0, 0]. Each dimension of the binary array can be indicative of a particular label and whether the label is relevant to vulnerability A. In an illustrative example, the first dimension (0) can be indicative of whether vulnerability A is remotely exploitable, the second dimension (1) can be indicative of whether vulnerability A affects confidential data, etc. The position of each dimension in the binary array can relate to the same label type throughout labels column 220 (e.g., the first dimension of each binary array in fingerprint table 200 is indicative of whether the corresponding vulnerability is remotely exploitable, the second dimension of each binary array in fingerprint table 200 is indicative of whether the corresponding vulnerability affects confidential data, and so forth). It is noted that a 20-dimension binary array is used by way of illustrative example. The binary array can include a string of any size where the values of the binary array relate to respective labels (e.g., a 5-dimension binary array, a 50-dimension binary array, a 200-dimension binary array, etc.).

Returning to FIG. 1, in some implementations, fingerprints 154 can be generated by user input. For example, for each vulnerability, a user can assign one or more labels to the vulnerability. In some implementations, fingerprints 154 can be generated automatically. In an example, fingerprints 154 can be generated using labeler 122. Labeler 122 can automatically identify one or more labels based on, for example, ransomware events, metadata related to the vulnerability, a machine-learning model, etc.

Reduced fingerprints 156 can include one or more principal components generated from the labels data of fingerprints 154. Principal components are new variables constructed as linear combinations or mixtures of a set of initial variables (e.g., fingerprints 154). Reduced fingerprints 156 can be generated using reducer 124. In some implementations, reducer 124 can generate, using a dimensionality reduction technique, each reduced fingerprint 156 by reducing the binary array of a corresponding fingerprint 154 (e.g., a 20-dimension binary array) to a two-dimension value. Dimensionality reduction refers to the technique of reducing the dimension of a data set. For example, the 20-dimension binary array of vulnerability A of FIG. 2 ([0, 1, 0, 1, 0, 1, 1, 0, 0, 0, 1, 0, 1, 1, 1, 1, 1, 0, 0, 0]) can be reduced to a two-dimensional value of [−1.4, 0.5]. In some implementations, the two-dimensional value can be grid coordinates of a two-dimensional graph (e.g., a scatter plot).

The dimensionality reduction technique(s) can include one or more of, for example, Principal Component Analysis (PCA), non-negative matrix factorization (NMF), Linear Discriminant Analysis (LDA), Generalized Discriminant Analysis (GDA), Missing Values Ratio, Low Variance Filter, High Correlation Filter, Backward Feature Elimination, Forward Feature Construction, Random Forests, etc.

By way of illustrative example, dimensionality reduction will be discussed in view of PCA. However, those skilled in the art would understand that any dimensionality reduction technique can be applied. PCA is a technique for analyzing large datasets (that contain a high number of dimensions and/or features per observation) by reducing the datasets to smaller datasets. By reducing the datasets, PCA can increase the interpretability of data while preserving the maximum amount of information. PCA can further enable the visualization of multidimensional data by identifying clusters (regions or groups) of correlated data.

In some implementations, reducer 124 can compute the eigenvectors and eigenvalues of the binary array (or any other fingerprint representation, such as a matrix array) to identify the principal components. In some implementations, where the fingerprint data is, for example, represented by a metadata table, reducer 124 can first standardize the data (e.g., standardize the range of the continuous initial variables so that each one of them contributes equally to the analysis). Reducer 124 can compute the eigenvectors and order the eigenvectors by their respective eigenvalues in descending order. This allows reducer 124 to identify the principal components in order of significance. Reducer 124 can remove (e.g., discard) components of lesser significance (e.g., low eigenvalues) to generate a feature vector. The feature vector can include a matrix of the eigenvectors of the components that will remain. Reducer 124 can then recast the obtained data along the principal component axes of a scatter plot. As such reducer 124 can linearly transform the fingerprints 154 into a new coordinate system where most of the variation in the reduced fingerprints 156 can be described with fewer dimensions than the initial fingerprints 154. Reducer 124 can apply a PCA technique using, for example, one or more formulae, one or more equations, one or more machine-learning models, etc.

The reduced fingerprints 156 can be plotted on a scatter plot and reducer 124 can identify subsets of reduced fingerprints based on one or more identified correlations between the reduced fingerprints in the subsets. Each subset (referred to as a "region") can be indicative of specific characteristics relating to the correlating vulnerabilities. In some implementations, ransomware events data 148 can be used to identify reduced fingerprints associated with a ransomware event. Reducer 124 can then generate the groups by identifying clusters of vulnerabilities associated with ransomware events.

Figure 3:
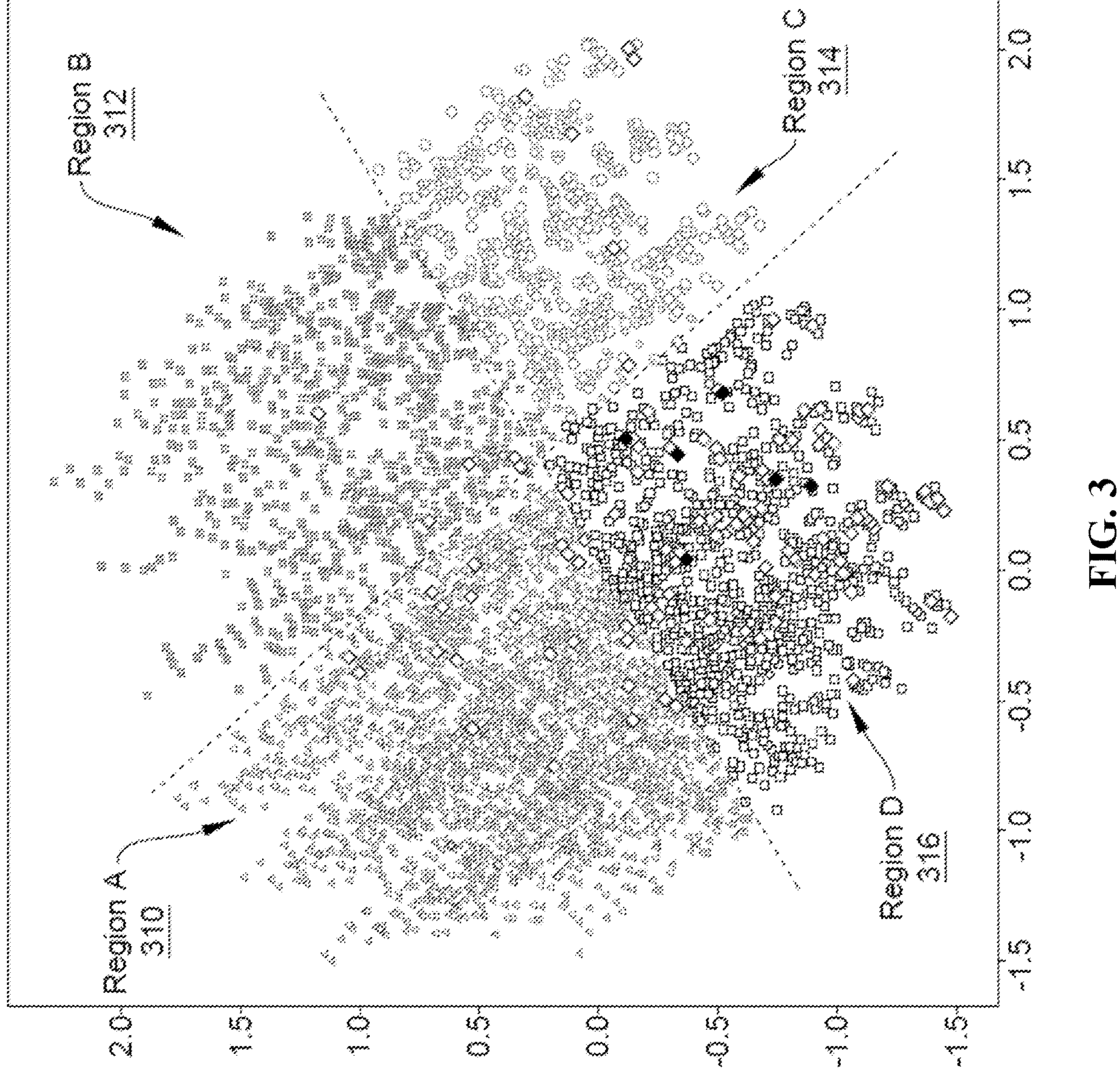
FIG. 3 is a graph illustrating the different regions of plotted reduced fingerprints, in accordance with some implementations of the present disclosure.

FIG. 3 is a graph illustrating the different regions of plotted reduced fingerprints, in accordance with aspects of the present disclosure. In particular, FIG. 3 illustrates a scatter plot where the plotted reduced fingerprints are assigned to either region A 310, region B 312, region C 314, or region D316. Fingerprints in region A can be represented by triangle symbols, fingerprints in region B can be represented by x symbols, fingerprints in region C can be represented by circle symbols, and fingerprints in region D can be represented by square symbols. In some areas, certain fingerprints can represent a vulnerability with an exploit and/or a vulnerability used in a ransomware event. In particular, each unshaded diamond "◇" represents a vulnerability with an exploit and each shaded diamond "◆" represents a vulnerability used in a ransomware event. Region A 310 is indicative of vulnerabilities with relatively few exploits. Region B 312 is indicative of vulnerabilities with fewer exploits than region A 310. Regions C 314 and D 316 are indicative of vulnerabilities with a proportionally higher number of exploits.

Returning to FIG. 1, assessment data 162 can include display data 164, prediction rating data 166, and predictive model 168. Display data 164 and prediction rating data 166 can be generated by model generator 126. Display data 164 can include instances of visual representations of areas of interest related to the vulnerabilities. In some implementations, display data can include graphs, charts, tables, etc. Model generator 126 can generate the display data 164 based on user input (e.g., a user can mark the areas of interest), automatically (e.g., based on standard deviation values, gaussian distribution values, etc.), or any combination thereof. For example, model generator 126 can automatically generate the overlay data and user input can adjust the overlay data. In some implementations, the display data (e.g., the scatter plot with the overlay data) can be referred to as the predictive model and stored as predictive model 168. In particular, predictive system 120 can receive data related to a new vulnerability, generate a fingerprint and then a reduced fingerprint for the vulnerability, and map the reduced fingerprint on the scatter plot. Based on the location of the reduced fingerprint (e.g., its coordinates), predictive systems can determine the likelihood of a ransomware event occurring using the corresponding vulnerability.

Figure 4:
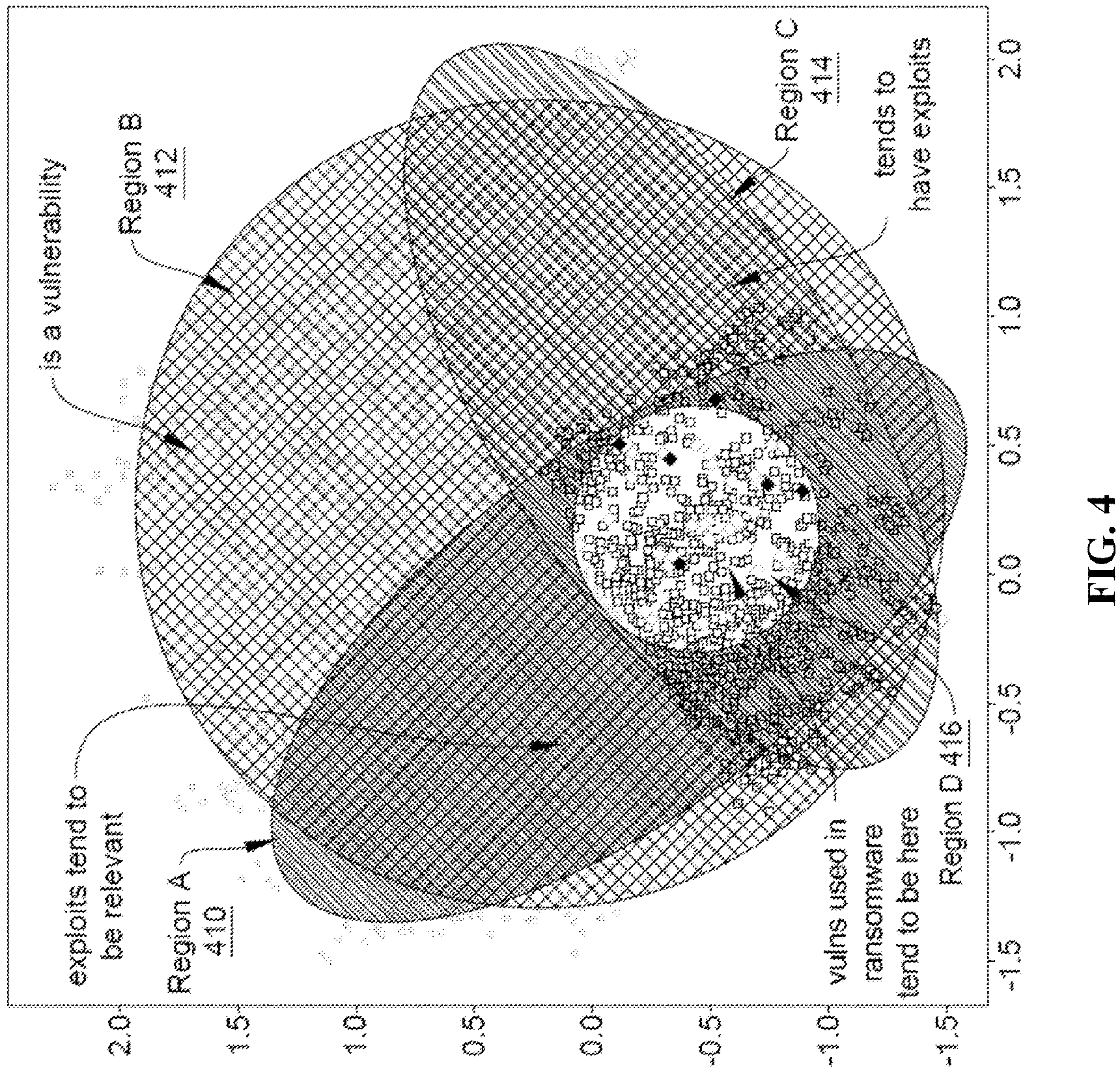
FIG. 4 is a graph illustrating example display data, in accordance with some implementations of the present disclosure.

FIG. 4 is a graph illustrating example display data, in accordance with aspects of the present disclosure. In particular, FIG. 4 illustrates the scatter plot of FIG. 3 where the plotted reduced fingerprints are grouped using one or more circular or oval overlays (region A 410, region B 412, region C 414, and region D 416). Region A 410 is indicative of vulnerabilities where exploits tend to be relevant. Region B 412 is indicative of vulnerabilities with few exploits. Region C 414 is indicative of vulnerabilities that tend to have exploits. Region D 316 is indicative of vulnerabilities used in ransomware events.

Returning to FIG. 1, prediction rating data 166 can indicate how similar a vulnerability is to other vulnerabilities known to have been used in ransomware events. In some implementations, model generator 126 can correlate each rating to a particular region of the display data. Each rating can be used to indicate a likelihood of a ransomware event occurring for a new vulnerability fingerprinted to the particular region. It is noted that the different regions are discussed by way of illustrative example, and that any number of regions can be generated and/or used. In it noted that the choice of symbols is for illustrative purposes and any type of symbols can be used. In some implementations, the symbol can be used for multiple regions.

FIG. 5 is an example ratings table 500, in accordance with aspects of the present disclosure. Rating table 500 includes a set of records, each record listing a nearest region center and a corresponding ransomware likelihood rating. The region center can relate to an overlay center, a cluster center, etc. As shown, ratings table 500 include region column 510 and rating column 520. Region column 510 includes a listing of nearest region centers. The nearest region centers can include particular regions on the scatter plot. Ratings column 520 includes a listing of ratings indicative of a likelihood (e.g., low, medium, high, critical, etc.) of a ransomware event for vulnerabilities fingerprinted to the corresponding region. As such, using the predictive model 168, each new vulnerability can be plotted and ransomware likelihood rating can be generated for the new vulnerability. It is noted that the rating are discussed by way of illustrative example, and that any amount of rating or types or ratings can be used.

In some implementations, data store 140 can be configured to store data that is not accessible to a user of computer system architecture 100. For example, ransomware data 142 and processed data 152 are not accessible to a user (e.g., an operator) of computer system architecture 100. In some implementations, all data stored at data store 140 can be inaccessible by the user of computer system architecture 100. In other or similar implementations, a portion of data stored at data store 140 can be inaccessible by the user while another portion of data stored at data store 140 can be accessible by the user. In some implementations, one or more portions of data stored at data store 140 can be encrypted using an encryption mechanism that is unknown to the user (e.g., data is encrypted using a private encryption key). In other or similar implementations, data store 140 can include multiple data stores where data that is inaccessible to the user is stored in one or more first data stores and data that is accessible to the user is stored in one or more second data stores.

In implementations, a "user" can be represented as a single individual. However, other implementations of the disclosure encompass a "user" being an entity controlled by a plurality of users and/or an automated source. For example, a set of individual users federated as a group of administrators can be considered a "user."

Figure 6:
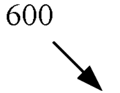
FIG. 6 is a flow chart of a method for generating a predictive model, in accordance with some implementations of the present disclosure.
Figure 6:
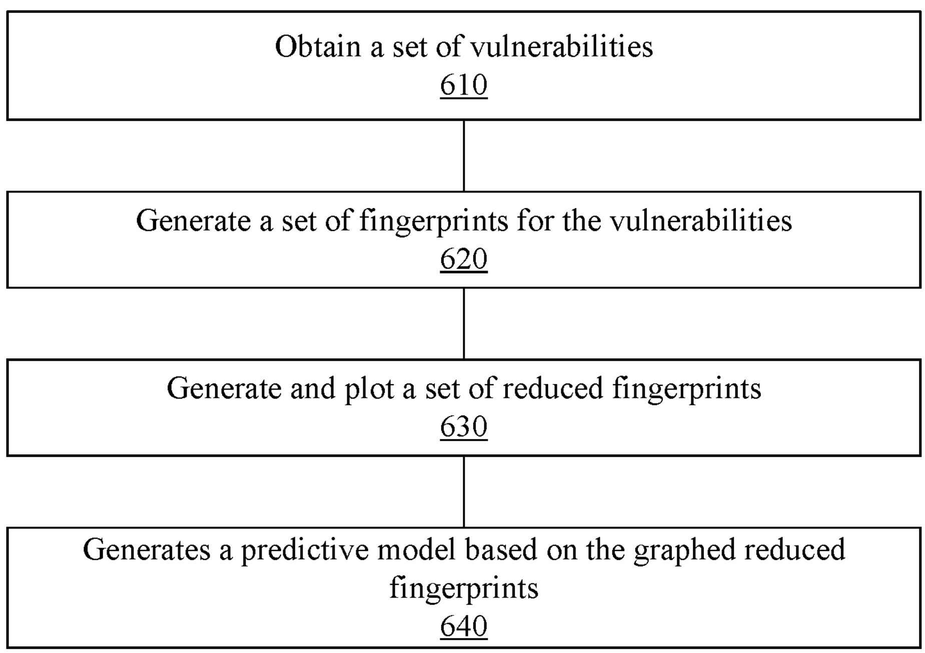

FIG. 6 is a flow chart of a method 600 for generating a predictive model, according to aspects of the present disclosure. Method 600 is performed by processing logic that can include hardware (circuitry, dedicated logic, etc.), software (such as is run on a general-purpose computer system or a dedicated machine), firmware, or some combination thereof. In one implementation, method 600 can be performed by a computer system, such as computer system architecture 100 of FIG. 1. In other or similar implementations, one or more operations of method 600 can be performed by one or more other machines not depicted in the figures. In some aspects, one or more operations of method 600 can be performed by client device 110 and/or prediction system 120.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 610, processing logic obtains a set of vulnerabilities. The vulnerabilities can be known vulnerabilities. In one example, the processing logic obtains the vulnerabilities from data store 140.

At operation 620, processing logic generates a set of fingerprints for the vulnerabilities. In particular, the processing logic generates a fingerprint for each of the vulnerabilities. Each fingerprint can include a set of labels assigned to the vulnerability. In an implementation, the fingerprint for each vulnerability can be a n-dimension binary array.

At operations 630, processing logic generates and plots a set of reduced fingerprints. In some implementations, the processing logic can apply one or more dimensionality reduction technique(s), such a PCA. In particular, the processing logic can reduce each n-binary array to a pair of principal components and graph the principal components on a scatter plot. The PCA can also determine one or more correlations between the different sets of reduced fingerprints.

At operation 640, processing logic generates a predictive model based on the graphed reduced fingerprints. The predictive model can be generated by applying one or overlays on the graphed reduced fingerprints and assigning, to each overlay, a rating (e.g., critical, medium, low, etc.). In some implementations, the overlays can be determined based on identifying one or more clusters of vulnerabilities that have been exploited in recorded ransomware events.

Figure 7:
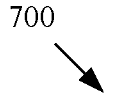
FIG. 7 is a flow chart of a method for generating a rating for a new vulnerability, in accordance with some implementations of the present disclosure.
Figure 7:
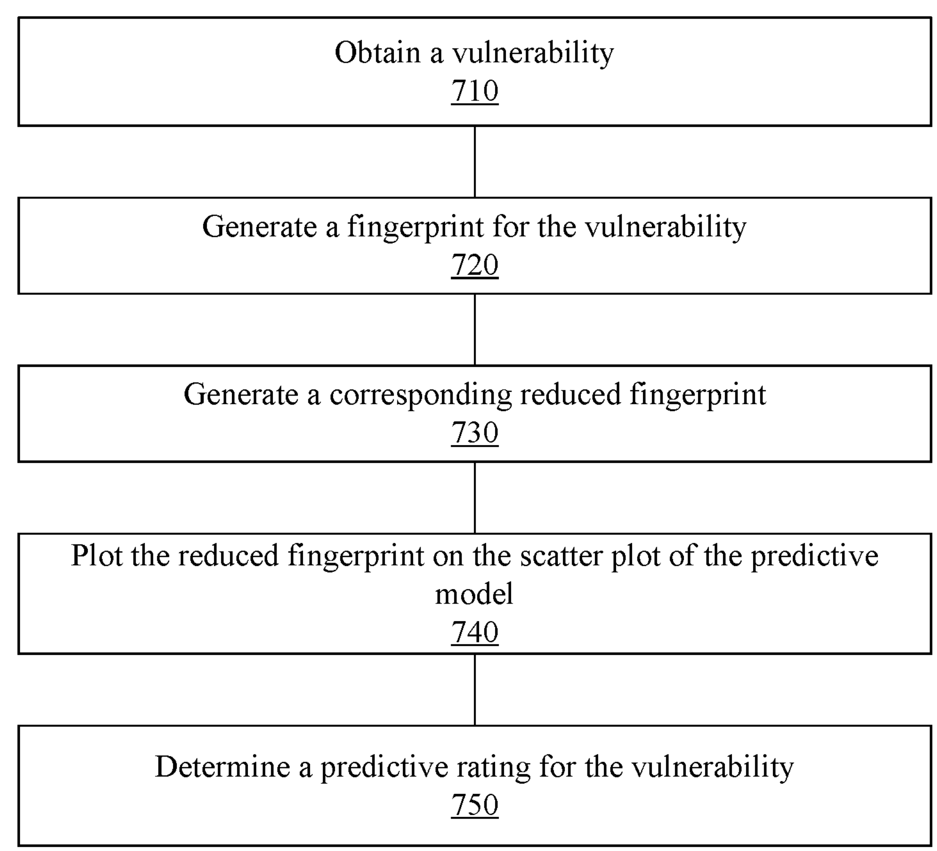

FIG. 7 is a flow chart of a method 700 for generating a rating for a new vulnerability, according to aspects of the present disclosure. Method 700 is performed by processing logic that can include hardware (circuitry, dedicated logic, etc.), software (such as is run on a general-purpose computer system or a dedicated machine), firmware, or some combination thereof. In one implementation, method 700 can be performed by a computer system, such as computer system architecture 100 of FIG. 1. In other or similar implementations, one or more operations of method 700 can be performed by one or more other machines not depicted in the figures. In some aspects, one or more operations of method 700 can be performed by client device 110 and/or prediction system 120.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 710, processing logic obtains a vulnerability. In an example, the vulnerability can be a newly discovered vulnerability, a vulnerability not previously added to a predictive model, an updated vulnerability (e.g., a vulnerability for which one or more labels changed), etc.

At operation 720, processing logic generates a fingerprint for the vulnerability. In particular, the vulnerability is assigned a set of labels. In an implementation, the fingerprint is an n-dimension binary array.

At operation 730 generates a corresponding reduced fingerprint. In some implementations, the processing logic can apply one or more dimensionality reduction technique(s), such a PCA, to reduce the fingerprint (e.g., the corresponding n-dimension binary array) to a pair of principal components.

At operation 740, processing logic can plot the reduced fingerprint (e.g., the principal components) on the scatter plot of the predictive model.

At operation 750, processing logic can determine a predictive rating for the vulnerability. In some embodiments, the predictive rating can be determined based on the location of the reduced fingerprint on the predictive model. Processing logic can then display the rating (e.g., low, medium, critical, etc.) on the UI of the client device.

Figure 8:
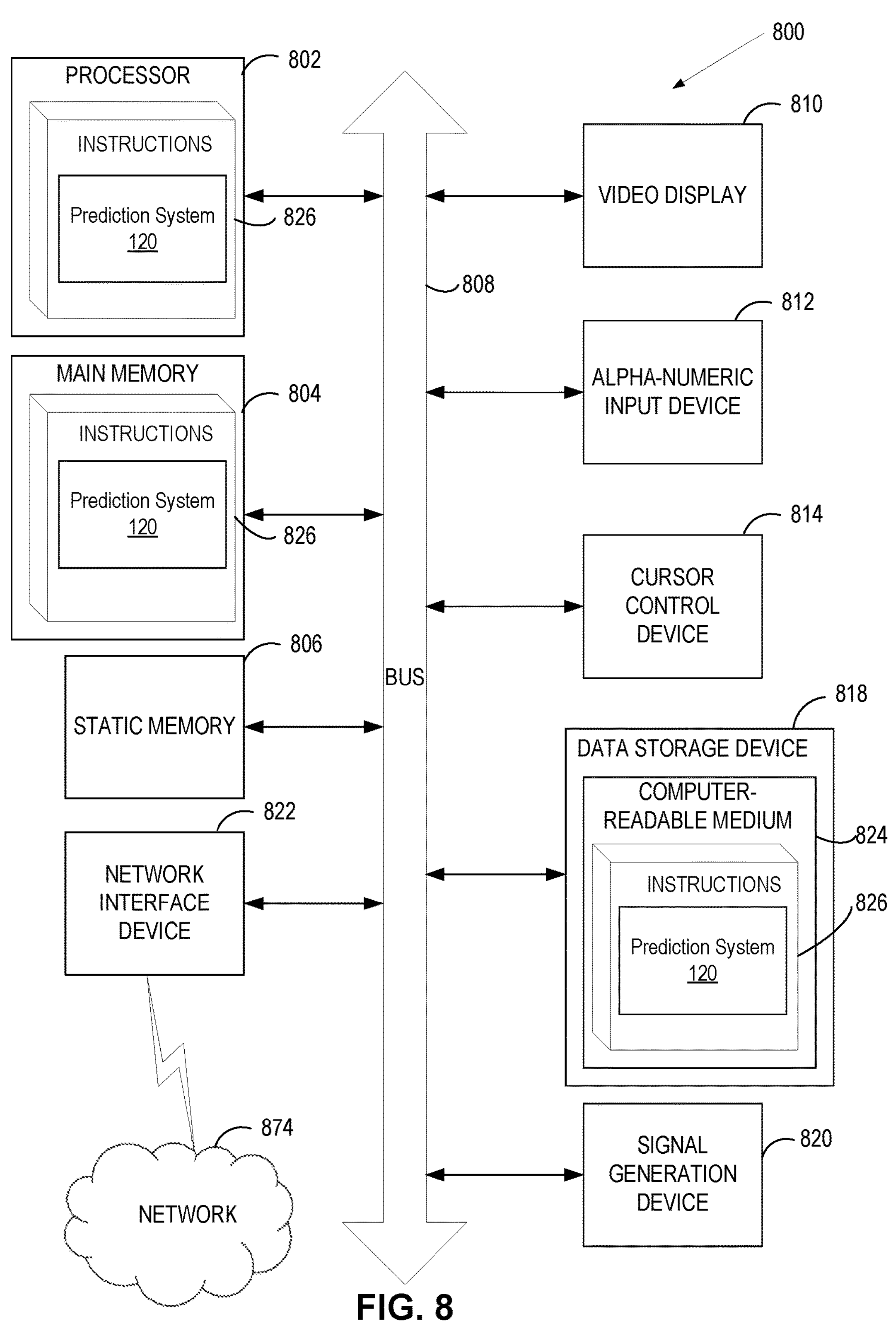
FIG. 8 is a block diagram illustrating a computer system, in accordance with some implementations of the present disclosure.

FIG. 8 is a block diagram illustrating a computer system 800, according to certain implementations. In some implementations, computer system 800 can be connected (e.g., via a network, such as a Local Area Network (LAN), an intranet, an extranet, or the Internet) to other computer systems. Computer system 800 can operate in the capacity of a server or a client computer in a client-server environment, or as a peer computer in a peer-to-peer or distributed network environment. Computer system 800 can be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 can include a processing device 802, a volatile memory 804 (e.g., Random Access Memory (RAM)), a non-volatile memory 806 (e.g., Read-Only Memory (ROM) or Electrically-Erasable Programmable ROM (EEPROM)), and a data storage device 818, which can communicate with each other via a bus 808.

Processing device 802 can be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 800 can further include a network interface device 822 (e.g., coupled to network 874). Computer system 800 also can include a video display unit 810 (e.g., an LCD), an alphanumeric input device 812 (e.g., a keyboard), a cursor control device 814 (e.g., a mouse), and a signal generation device 820.

In some implementations, data storage device 818 can include a non-transitory computer-readable storage medium 824 on which can store instructions 826 encoding any one or more of the methods or functions described herein, including instructions encoding components of FIG. 1 (e.g., prediction system 120, client device 110, etc.) and for implementing methods described herein.

Instructions 826 can also reside, completely or partially, within volatile memory 804 and/or within processing device 802 during execution thereof by computer system 800, hence, volatile memory 804 and processing device 802 can also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can include a general-purpose computer system selectively programmed by a computer program stored in the computer system. Such a computer program can be stored in a computer-readable tangible storage medium.

The methods and illustrative examples described herein are not inherently related to any particular computer or other apparatus. Various general-purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:

obtaining, by a processor, a plurality of vulnerabilities associated with one or more computer systems;

generating a set of fingerprints by assigning a set of labels to each of the plurality of vulnerabilities, wherein each fingerprint of the set of fingerprints is associated with a respective vulnerability of the plurality of vulnerabilities, wherein each label of each set of labels indicates at least one of a particular parameter or a particular attribute of the respective vulnerability;

generating a set of reduced fingerprints by performing one or more dimensionality reduction operations on each set of labels of each respective fingerprint, wherein each reduced fingerprint comprises a value configured to retain at least a portion of the information from the respective fingerprint;

generating a coordinate system based on the set of reduced fingerprints;

generating a predictive model comprising the coordinate system and one or more overlays applied on the coordinate system by identifying one or more groups of reduced fingerprints based on one or more determined correlations, wherein each overlay corresponds to a respective group of the one or more groups of reduced fingerprints, and assigning a ransomware likelihood rating to each overlay based on ransomware events data, wherein the ransomware likelihood rating indicates a likelihood that a vulnerability within the respective group will be used in a ransomware event;

receiving a new vulnerability;

generating a new fingerprint for the new vulnerability;

generating, from the new fingerprint, a reduced fingerprint for the new vulnerability;

determining a position, on the coordinate system, of the reduced fingerprint; and determining a rating for the new vulnerability based on the position on the coordinate system, wherein the rating reflects a likelihood of the new vulnerability being used in a ransomware event.

2. The method of claim 1, wherein the rating is determined based on identifying a center of the group of reduced fingerprints in relation to the coordinate system.

3. The method of claim 1, wherein the group is identified using ransomware event data.

4. The method of claim 1, wherein each fingerprint of the set of fingerprints is a n-dimension binary array.

5. The method of claim 1, wherein each value comprises a pair of principal components.

6. The method of claim 1, wherein the coordinate system is generated using one or more dimensional reduction techniques.

7. A system, comprising:

a memory device; and a processing device, operatively coupled to the memory device, to perform operations comprising:

obtaining a plurality of vulnerabilities associated with one or more computer systems;

generating a set of fingerprints by assigning a set of labels to each of the plurality of vulnerabilities, wherein each fingerprint of the set of fingerprints is associated with a respective vulnerability of the plurality of vulnerabilities, wherein each label of each set of labels indicates at least one of a particular parameter or a particular attribute of the respective vulnerability;

generating a set of reduced fingerprints by performing one or more dimensionality reduction operations on each set of labels of each respective fingerprint, wherein each reduced fingerprint comprises a value configured to retain at least a portion of the information from the respective fingerprint;

generating a coordinate system based on the set of reduced fingerprints;

generating a predictive model comprising the coordinate system and one or more overlays applied on the coordinate system by identifying one or more groups of reduced fingerprints based on one or more determined correlations, wherein each overlay corresponds to a respective group of the one or more groups of reduced fingerprints, and assigning a ransomware likelihood rating to each overlay based on ransomware events data, wherein the ransomware likelihood rating indicates a likelihood that a vulnerability within the respective group will be used in a ransomware event;

receiving a new vulnerability;

generating a new fingerprint for the new vulnerability;

generating, from the new fingerprint, a reduced fingerprint for the new vulnerability;

determining a position, on the coordinate system, of the reduced fingerprint; and determining a rating for the new vulnerability based on the position on the coordinate system, wherein the rating reflects a likelihood of the new vulnerability being used in a ransomware event.

8. The system of claim 7, wherein the rating is determined based on identifying a center of the group of reduced fingerprints in relation to the coordinate system.

9. The system of claim 7, wherein the group is identified using ransomware event data.

10. The system of claim 7, wherein each fingerprint of the set of fingerprints is a n-dimension binary array.

11. The system of claim 7, wherein each value comprises a pair of principal components.

12. The system of claim 7, wherein the coordinate system is generated using one or more dimensional reduction techniques.

13. A non-transitory computer readable storage medium comprising instructions for a server that, when executed by a processing device, cause the processing device to perform operations comprising:

obtaining a plurality of vulnerabilities associated with one or more computer systems;

generating a set of fingerprints by assigning a set of labels to each of the plurality of vulnerabilities, wherein each fingerprint of the set of fingerprints is associated with a respective vulnerability of the plurality of vulnerabilities, wherein each label of each set of labels indicates at least one of a particular parameter or a particular attribute of the respective vulnerability;

generating a set of reduced fingerprints by performing one or more dimensionality reduction operations on each set of labels of each respective fingerprint, wherein each reduced fingerprint comprises a value configured to retain at least a portion of the information from the respective fingerprint;

generating a coordinate system based on the set of reduced fingerprints;

generating a predictive model comprising the coordinate system and one or more overlays applied on the coordinate system by identifying one or more groups of reduced fingerprints based on one or more determined correlations, wherein each overlay corresponds to a respective group of the one or more groups of reduced fingerprints, and assigning a ransomware likelihood rating to each overlay based on ransomware events data, wherein the ransomware likelihood rating indicates a likelihood that a vulnerability within the respective group will be used in a ransomware event;

receiving a new vulnerability;

generating a new fingerprint for the new vulnerability;

generating, from the new fingerprint, a reduced fingerprint for the new vulnerability;

determining a position, on the coordinate system, of the reduced fingerprint; and determining a rating for the new vulnerability based on the position on the coordinate system, wherein the rating reflects a likelihood of the new vulnerability being used in a ransomware event.

14. The non-transitory computer readable storage medium of claim 13, wherein the rating is determined based on identifying a center of the group of reduced fingerprints in relation to the coordinate system.

15. The non-transitory computer readable storage medium of claim 13, wherein the group is identified using ransomware event data.

16. The non-transitory computer readable storage medium of claim 13, wherein each fingerprint of the set of fingerprints is a n-dimension binary array.

17. The non-transitory computer readable storage medium of claim 13, wherein each value comprises a pair of principal components.

* * * * *